United States Patent
Chida (10) Patent No.: US 7,406,019 B2
(45) Date of Patent: Jul. 29, 2008

(54) SEMICONDUCTOR LASER APPARATUS AND OPTICAL PICKUP APPARATUS

(75) Inventor: Atsushi Chida, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 610 days.

(21) Appl. No.: 11/044,707

(22) Filed: Jan. 28, 2005

(65) Prior Publication Data

US 2005/0207317 A1    Sep. 22, 2005

(30) Foreign Application Priority Data

Jan. 30, 2004    (JP) .............................. 2004-024901
Jan. 20, 2005    (JP) .............................. 2005-013391

(51) Int. Cl.
   *G11B 7/00*    (2006.01)
(52) U.S. Cl. .................... 369/122; 369/44.12
(58) Field of Classification Search ............... None
   See application file for complete search history.

(56) References Cited

U.S. PATENT DOCUMENTS

| | | | | |
|---|---|---|---|---|
| 5,621,714 | A * | 4/1997 | Kobayashi et al. ..... | 369/110.03 |
| 6,542,315 | B2 * | 4/2003 | Shindo ..................... | 359/726 |
| 6,868,105 | B2 * | 3/2005 | Yagi et al. ................. | 372/36 |
| 2002/0018436 | A1 * | 2/2002 | Negoro et al. ............ | 369/112.29 |
| 2002/0097659 | A1 * | 7/2002 | Furuhata et al. .......... | 369/112.04 |
| 2003/0165106 | A1 * | 9/2003 | Dambach et al. ......... | 369/112.07 |

FOREIGN PATENT DOCUMENTS

JP    2626106    4/1997

* cited by examiner

*Primary Examiner*—Joseph Feild
*Assistant Examiner*—Peter Vincent Agustin
(74) *Attorney, Agent, or Firm*—Nixon & Vanderhye P.C.

(57) ABSTRACT

A semiconductor laser apparatus is provided which comprises a semiconductor laser device for emitting laser light and a base having a major surface and a circumferential side surface. The circumferential side surface has an upper surface and a lower surface. The semiconductor laser device is mounted on the major surface of the base. At least one of the upper and lower surfaces of the circumferential side surface is tilted from a direction perpendicular to the major surface so that a height in a vertical direction of the semiconductor laser apparatus is reduced or minimized.

14 Claims, 5 Drawing Sheets

Prior Art

SEMICONDUCTOR LASER APPARATUS AND OPTICAL PICKUP APPARATUS

This nonprovisional application claims priority under 35 U.S.C. §119(a) on Patent Application No. 2004-024901 filed in Japan on Jan. 30, 2004, and Patent Application No. 2005-013391 filed in Japan on Jan. 20, 2005, the entire contents of which are hereby incorporated by reference.

BACKGROUND

1. Field of the Technology

The present technology relates to a semiconductor laser apparatus for recording/reproducing information onto/from an information recording medium, such as an optical disc or the like, and an optical pickup apparatus using the same.

2. Description of the Related Art

A conventional optical pickup apparatus using the above-described type of semiconductor laser apparatus will be described.

Figure 4A:
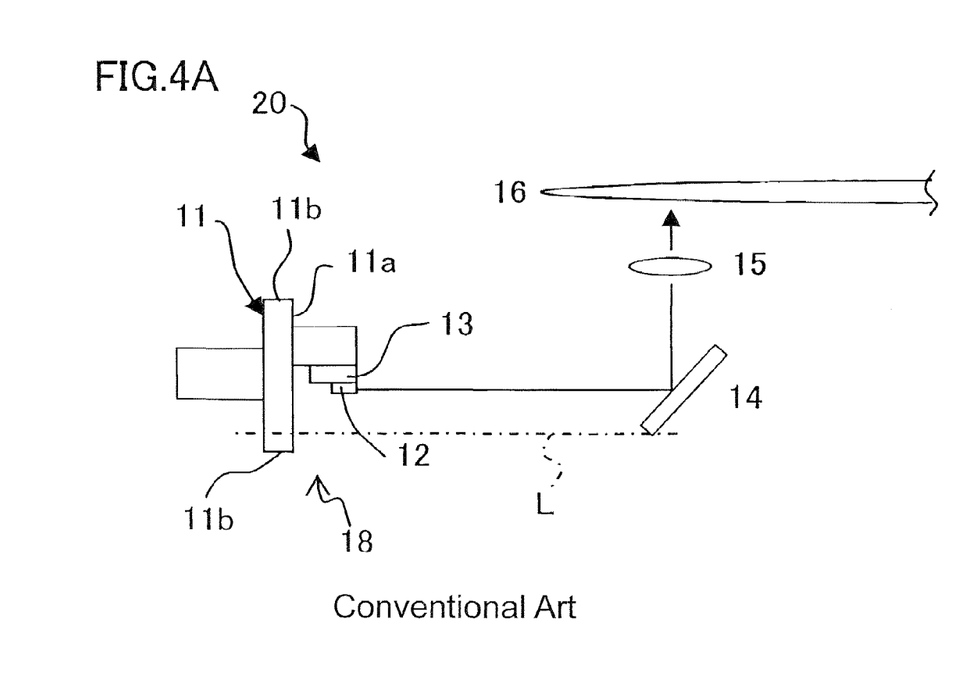
FIG. 4A is a side view showing an outline structure of a conventional optical pickup apparatus.
Figure 4B:
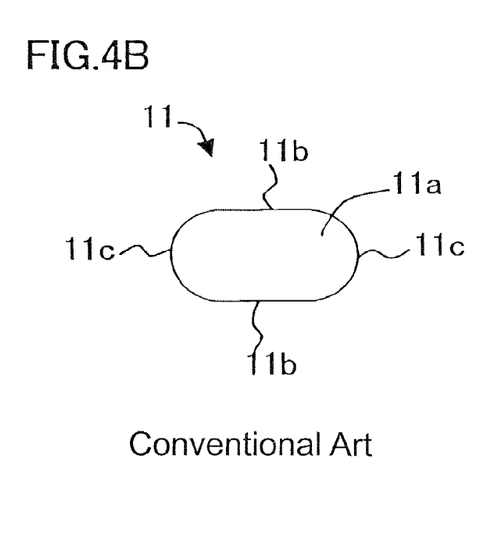
FIG. 4B is a front view showing a circumferential portion of a base portion of a semiconductor laser apparatus used in the conventional optical pickup apparatus of FIG. 4A.

FIG. 4A is a side view showing an outline structure of the conventional optical pickup apparatus. FIG. 4B is a front view showing a circumferential portion of a base portion of a semiconductor laser apparatus used in the conventional optical pickup apparatus.

As shown in FIG. 4A, the conventional optical pickup apparatus 20 has a semiconductor laser apparatus 18 in which parts, such as a semiconductor laser device (LD) 12, a monitor submount 13 and the like, are provided on a base 11; a reflection mirror 14; an objective lens 15; and a housing (not shown) which accommodates and fixes these components with a predetermined positional relationship among them.

As shown in FIG. 4B, a circumferential portion of the base 11 has two straight portions 11b which are parallel to each other and are disposed at upper and lower positions in the front view, and two arc portions 11c which are disposed at left- and right-hand positions in the front view and connect the straight portions 11b. The arc portions 11c are engaged with the housing (not shown) of the optical pickup apparatus 20, and are used to rotate the base 11 so as to adjust a site to be irradiated with the laser light. The straight portion 11b is not usually engaged with the housing, i.e., is not in contact with the housing. When the base 11 is engaged with the housing, the two straight portions 11b are arranged vertically, i.e., one of them is disposed at a higher position than that of the other.

Further, the reflection mirror 14, the objective lens 15 and an actuator (not shown) integrated with the objective lens 15 are fixed to the housing with a predetermined positional relationship among them.

In the semiconductor laser apparatus 18, the semiconductor laser device (LD) 12 is mounted on the monitor submount 13. Also, the monitor submount 13, a signal photodetector (not shown), a hologram device and the like are provided on a major surface 11a of the base 11.

In the optical pickup apparatus 20, laser light emitted from the semiconductor laser device 12 is reflected from the reflection mirror 14. Light whose traveling direction has been changed is transmitted via the objective lens 15 to an information recording surface of an optical disc 16.

In the optical pickup apparatus 20, the base 11 is fixed to the housing so that the straight portions 11b are vertically arranged, and laser light emitted from the semiconductor laser device 12 which travels in a direction parallel to the information recording surface of the optical disc 16 falls on the reflection mirror 14.

Figure 5:
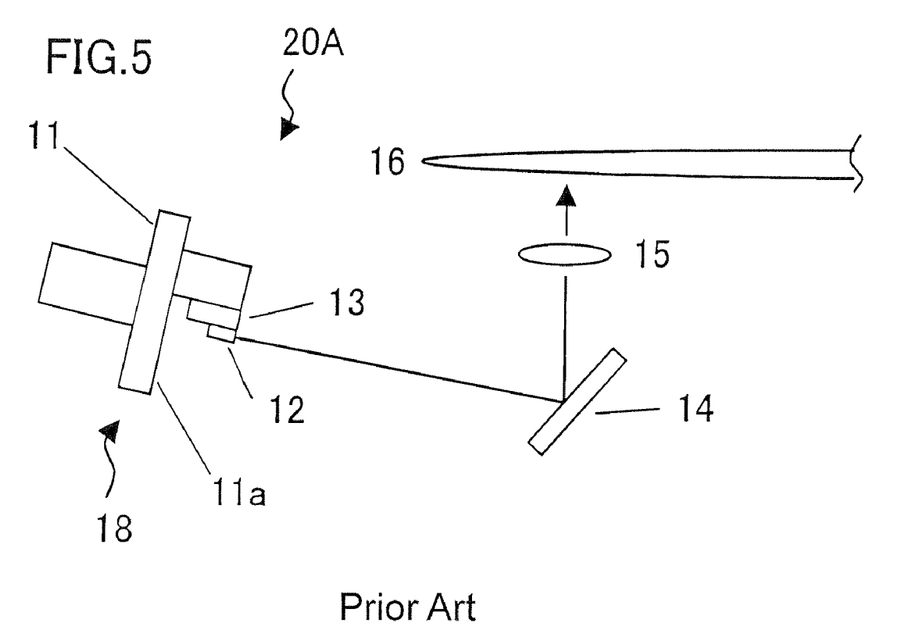
FIG. 5 is a side view showing another exemplary outline structure of a conventional optical pickup apparatus.

In order to make the optical pickup apparatus 20 thinner, the semiconductor laser apparatus 18 may be attached to an upper portion of the housing with a predetermined angle with respect to the housing, as shown in FIG. 5 (e.g., see, Japanese Patent No. 2626106).

FIG. 5 shows an optical pickup apparatus 20A in which the semiconductor laser apparatus 18 is attached to an upper portion of the housing in a tilted manner (a predetermined angle with respect to the housing). The lower edge of the base 11 (the lower straight portion 11b) is positioned higher than the lower edge of the reflection mirror 14 (higher than a phantom line L of FIG. 4). Thus, the lower edge of the base 11 does not project downward from the lower edge of the reflection mirror 14, resulting in the thinner optical pickup apparatus 20A.

SUMMARY

According to an aspect of an exemplary embodiment, a semiconductor laser apparatus comprises a semiconductor laser device for emitting laser light and a base having a major surface and a circumferential side surface. The circumferential side surface has an upper surface and a lower surface. The semiconductor laser device is mounted on the major surface of the base. At least one of the upper and lower surfaces of the circumferential side surface is tilted from a direction perpendicular to the major surface so that a height in a vertical direction of the semiconductor laser apparatus is reduced or minimized.

In one embodiment, the circumferential side surface of the base has two arc portions and two plane portions. The two arc portions are disposed in left- and right-hand positions in a front view, and the two straight portions are vertically disposed between the two arc portions and parallel to each other. The two straight portions being tilted in the same direction from the direction perpendicular to the major surface.

In one embodiment, the semiconductor laser device is mounted on the major surface of the base while being mounted on a monitor submount section.

In one embodiment, a signal photodetector of receiving incident light to detect a signal, and an optical device of splitting laser light returning from the outside thereof toward the signal photodetector, are provided on the major surface of the base.

In one embodiment, the semiconductor laser device is disposed in a manner that emits laser light in the direction perpendicular to the major surface of the base.

In one embodiment, the semiconductor laser device is disposed in a manner that emits laser light in a direction parallel to the major surface of the base. The semiconductor laser apparatus further comprises a raising mirror section of reflecting the laser light emitted from the semiconductor laser device to change a traveling direction of the laser light to the direction perpendicular to the major surface of the base.

In one embodiment, the base is an insulating frame in a concave form. The base has a plurality of conductive lead members in left- and right-hand surfaces of the circumferential side surface of the insulating frame, each conductive member extending from an outside to an inside of the left- and right-hand surfaces of the insulating frame. Each lead member is connected via a wire to electrodes of the semiconductor laser device and the signal photodetector in the insulating frame.

In one embodiment, the optical device is disposed in a manner that covers an opening of a concave inner portion of the insulating frame. At least one of the upper and lower surfaces of the circumferential side surface of the insulating frame and a side surface of the optical device are tilted from a direction perpendicular to a bottom surface of the concave inner portion on which the semiconductor laser device and the signal photodetector are disposed so that a height in a vertical direction of the semiconductor laser apparatus is reduced or minimized.

In one embodiment, the optical device is either a hologram device including a diffraction grating for diffracting laser light or a half mirror for transmitting one of laser light traveling from the semiconductor laser device and laser light traveling in a direction opposite thereto and reflecting the other laser light toward a predetermined direction.

In one embodiment, the signal photodetector receives the laser light split by the optical device to detect information recorded on a disc from the returning laser light, and performs focus error detection and tracking error detection.

According to another aspect of an exemplary embodiment, an optical pickup apparatus comprises the above-described semiconductor laser apparatus and a housing section. The semiconductor laser apparatus is fixed to the housing section in a manner such that the semiconductor laser apparatus is tilted from the housing section with a predetermined angle.

In one embodiment, the optical pickup apparatus further comprises an objective lens section and a reflection mirror section of reflecting the laser light emitted from the semiconductor laser apparatus toward the objective lens section. The semiconductor laser apparatus is tilted with respect to the housing section with the predetermined angle such that a lower edge of the semiconductor laser apparatus is disposed higher than a lower edge of the reflection mirror section.

In one embodiment, the optical pickup apparatus further comprises an objective lens section and a reflection mirror section for reflecting the laser light emitted from the semiconductor laser apparatus toward the objective lens section. The semiconductor laser apparatus is tilted with respect to the housing section with the predetermined angle such that an upper edge of the semiconductor laser apparatus is disposed lower than an upper edge of the objective lens.

In one embodiment, an angle between the upper surface and/or the lower surface of the circumferential side surface of the base in the semiconductor laser apparatus is determined, depending on the predetermined angle.

Hereinafter, functions of the exemplary embodiment presented herein will be described.

According to an exemplary embodiment, at least one of the upper and lower surfaces of the circumferential side surface of the base is tilted from the direction perpendicular to the major surface of the base in a manner that reduces (or minimizes) the height in the vertical direction of the semiconductor laser apparatus. When the semiconductor laser apparatus is attached to the housing in a tilted manner with a predetermined angle, an angle between the major surface of the base and the upper and/or lower surfaces of the circumferential side surface of the base is determined, depending on the predetermined angle. Therefore, an increase in the thickness of the optical pickup apparatus is substantially suppressed, thereby making it possible to obtain a thinner optical pickup apparatus.

Further, the semiconductor laser device may be disposed in a manner that emits light in a direction parallel to the major surface of the base. In this case, a raising mirror section is provided, which reflects laser light emitted from the semiconductor laser device to change the traveling direction of the light toward a direction perpendicular to the major surface of the base. As a result, a size in a horizontal direction (the lateral direction in FIG. 2) of the semiconductor laser apparatus can be reduced, and in addition, as described above, the thickness in the height direction (the vertical direction in FIG. 2) of the semiconductor laser apparatus can be made thinner. Therefore, the thickness of the optical pickup apparatus is made thinner. Thus, the technology described herein makes possible the advantages of providing an optical pickup apparatus, in which at least one of upper and lower surfaces of a circumferential side surface of a base is tilted from a direction perpendicular to a major surface of the base so that a height in a vertical direction of a semiconductor laser apparatus is reduced (or minimized), and therefore, when the semiconductor laser apparatus is attached to a housing with a predetermined angle, the upper and/or lower surfaces of the circumferential side surface of the base are not tilted vertically with an angle (i.e., the upper and/or lower surfaces of the circumferential side surface of the base can be horizontally oriented), thereby making it possible to substantially suppress an increase in the thickness of the optical pickup apparatus and achieve a smaller thickness.

These and other advantages of the present technology will become apparent to those skilled in the art upon reading and understanding the following detailed description with reference to the accompanying figures.

DESCRIPTION OF THE PREFERRED EMBODIMENTS

Hereinafter, the present technology will be described by way of illustrative examples with reference to the accompanying drawings.

In Embodiments 1 and 2, a semiconductor laser apparatus is applied to an optical pickup apparatus. In Embodiment 3, a specific structure of a semiconductor laser apparatus will be described. Note that parts which do not relate directly to the present invention will not be herein explained in detail.

Embodiment 1

Figure 1A:
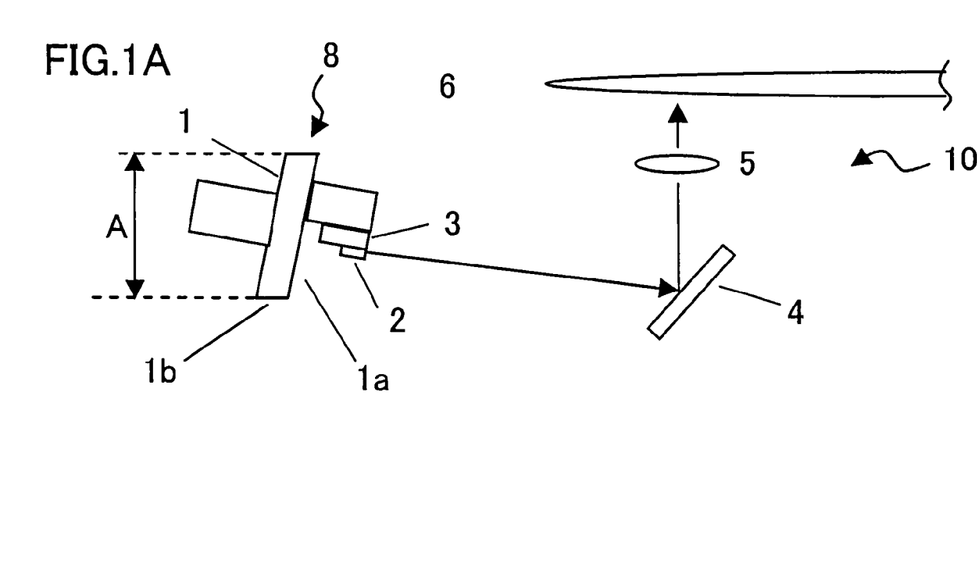
FIG. 1A is a side view showing an outline structure of an optical pickup apparatus according to Embodiment 1.
Figure 1B:
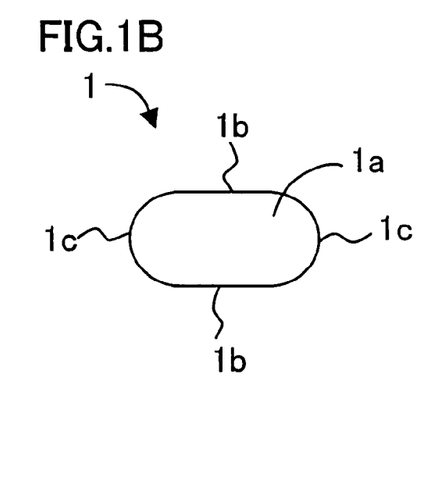
FIG. 1B is a front view showing a circumferential portion of a base portion of a semiconductor laser apparatus used in the optical pickup apparatus of FIG. 1A.

FIG. 1A is a side view showing an outline structure of an optical pickup apparatus according to Embodiment 1. FIG. 1B is a front view showing a circumferential portion of a base portion of a semiconductor laser apparatus used in the optical pickup apparatus.

As shown in FIG. 1A, the optical pickup apparatus 10 has a semiconductor laser apparatus 8 in which parts, such as a semiconductor laser device (LD) 2, a the monitor submount 3 and the like, are provided on a base 1; a reflection mirror 4 (reflection mirror section); an objective lens 5 (objective lens section); and a housing (housing section, not shown) which accommodates and fixes these components with a predetermined positional relationship among them.

In the semiconductor laser apparatus 8, the semiconductor laser device (LD) 2 is mounted on the monitor submount 3. Also, the monitor submount 3, a signal photodetector (not shown) which receives incident light to detect a signal, a hologram device (not shown) including a diffraction grating which diffracts laser light, and the like are provided on a major surface 1*a* of the base 1.

As shown in FIG. 1B, a circumferential portion (circumferential side surface) of the base 1 has two arc portions 1*c* (arc curved surface portions) which are disposed at left- and right-hand positions in the front view and two plane portions 1*b* which are arranged vertically (at upper and lower positions in the front view) between the arc portions 1*c*. The arc portions 1*c* are engaged with a housing (not shown) of the optical pickup apparatus 10, and are used to rotate the base 1 so as to adjust a site to be irradiated with light. The straight portion 1*b* is not usually engaged with the housing, i.e., is not in contact with the housing. When the base 1 is engaged with the housing, the two straight portions 1*b* are arranged vertically, i.e., one of them is disposed at a higher position than that of the other.

Further, the reflection mirror 4, the objective lens 5, an actuator (not shown) integrated with the objective lens 5, and the like are fixed to the housing.

In the optical pickup apparatus 10, the semiconductor laser device 2 is disposed perpendicular to the major surface 1*a* of the base 1. Laser light emitted from the semiconductor laser device 2 is reflected by the reflection mirror 4. The light whose traveling direction has been changed is transmitted via the objective lens 5 to an information recording surface of an optical disc 6. Laser light reflected from the information recording surface travels in the opposite direction, i.e., is transmitted via the objective lens 5 and reflected by the reflection mirror 4. The light is further diffracted by the diffraction grating provided in the hologram device to fall on the signal photodetector. In the signal photodetector, information recorded on the disc 6 is detected as a signal.

An important factor which determines a thickness of the optical pickup apparatus 10 is, for example, a thickness A of the semiconductor laser apparatus 8.

In Embodiment 1, the base 1 is engaged into the housing in a manner such that the semiconductor laser apparatus 8 has a predetermined angle with respect to the housing. The angle between the housing and the semiconductor laser apparatus 8 is determined to obtain a positional relationship between the reflection mirror 4 and the semiconductor laser apparatus 8 such that a lower edge (straight portion 1*b*) of the reflection mirror 4 is higher than a lower edge of the semiconductor laser apparatus 8, i.e., the lower edge (straight portion 1*b*) of the semiconductor laser apparatus 8 does not project downward from the lower edge of the reflection mirror 4. In this case, since the lower edge (straight portion 1*b*) of the semiconductor laser apparatus 8 does not project downward from the lower edge of the reflection mirror 4, the thickness of the optical pickup apparatus 10 can be made thinner than when the semiconductor laser apparatus 8 is attached to the housing with no angle.

Further, in Embodiment 1, an upper portion (upper straight portion 1*b*) of the circumferential portion (circumferential side surface) of the base 1 is tilted from a direction perpendicular to the major surface 1*a* of the base 1 in a direction which decreases the tilt angle. A lower portion (lower straight portion 1*b*) of the circumferential portion (circumferential side surface) of the base 1 is tilted from the direction perpendicular to the major surface 1*a* of the base 1 in a direction which increases the tilt angle (in the same direction as that decreases the angle; the anticlockwise direction). These angles have the same predetermined angle.

When the semiconductor laser apparatus 8 is attached to the housing with the predetermined angle in the above-described manner, the straight portions 1*b* of the base 1 are not tilted vertically as compared to when the straight portions 1*b* of the base 1 are perpendicular to the major surface 1*a* of the base 1 (conventional technology). As a result, an increase in the thickness A of the semiconductor laser apparatus 8 which is caused by these portions (the straight portions 1*b*) is suppressed, thereby making it possible to make the optical pickup apparatus 10 further thinner.

By setting the angle between the major surface 1*a* and the straight portion 1*b* depending on the attachment angle between the housing and the semiconductor laser apparatus 8, each straight portion 1*b* is not tilted vertically, i.e., is oriented horizontally, when the semiconductor laser apparatus 8 is attached to the housing with the predetermined angle. Therefore, the thickness A in the height direction of the semiconductor laser apparatus 8 is preferably made thinnest.

Embodiment 2

Figure 2:
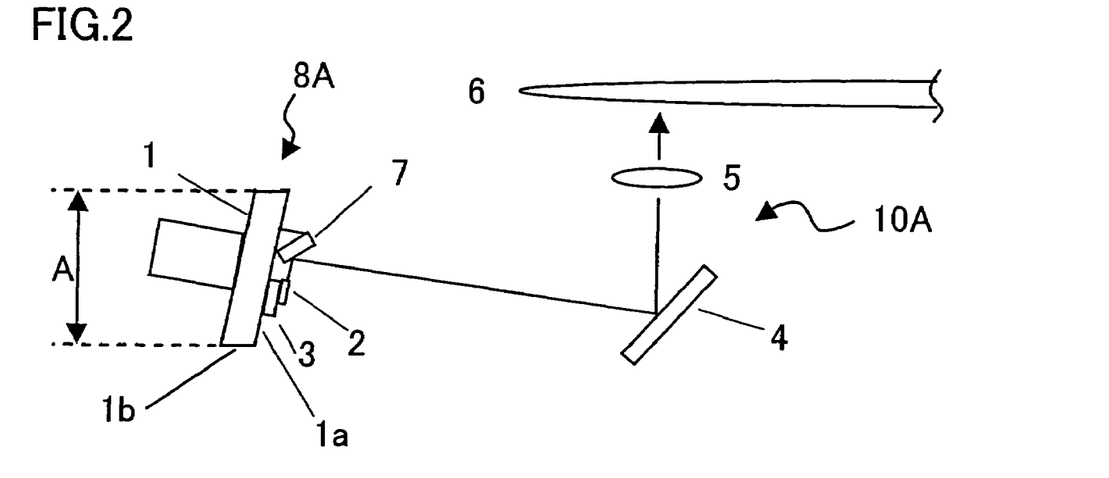
FIG. 2 is a side view showing an out line structure of an optical pickup apparatus according to Embodiment 2 of the present invention.

FIG. 2 is a side view showing an outline structure of an optical pickup apparatus according to Embodiment 2.

As shown in FIG. 2, in the optical pickup apparatus 10A, a longitudinal direction of a semiconductor laser device 2 mounted on a monitor submount 3 (monitor submount section) is parallel to a major surface 1*a* of a base 1. The semiconductor laser device 2 emits light in a direction parallel to the major surface 1*a*. A raising mirror 7 (raising mirror section) is provided on the major surface 1*a* of the base 1 so that laser light emitted from the semiconductor laser device 2 is reflected to change a traveling direction of the laser light into a direction perpendicular to the major surface 1*a*. The laser light traveling in the direction perpendicular to the major surface 1*a* is reflected from a reflection mirror 4 (reflection mirror section) to change the traveling direction of the laser light, so that the laser light is transmitted via an objective lens 5 to fall on an information recording surface of the optical disc 6.

In Embodiment 2 as well as Embodiment 1, an upper portion (upper straight portion 1*b*) of the circumferential portion (side surface) of the base 1 is tilted from a direction perpendicular to the major surface 1*a* of the base 1 in a direction which decreases the tilt angle. A lower portion (lower straight portion 1*b*) of the circumferential portion (circumferential side surface) of the base 1 is tilted from the direction perpendicular to the major surface 1*a* of the base 1 in a direction which increases the tilt angle (in the same direction as that decreases the angle; the anticlockwise direction). These angles have the same predetermined angle.

When the semiconductor laser apparatus 8A is attached to the housing with the predetermined angle in the above-described manner, the straight portions 1*b* of the base 1 are not tilted vertically as compared to when the straight portions 1*b* of the base 1 are perpendicular to the major surface 1*a* of the base 1 (conventional technology). As a result, an increase in a thickness A of the semiconductor laser apparatus 8A which is caused by these portions (the straight portions 1*b*) is suppressed, thereby making it possible to make the optical pickup apparatus 10A further thinner.

Further, in Embodiment 2, the longitudinal direction of the semiconductor laser device 2 is parallel to the major surface 1*a* so that laser light is emitted in a direction parallel to the major surface 1a of the base 1, and the raising mirror 7 is provided. Therefore, a size in the horizontal direction of the semiconductor laser apparatus BA (the lateral direction of FIG. 2) can be reduced in addition to the above-described reduced thickness A in the height direction. Thus, the optical pickup apparatus 10A can be made thinner and smaller.

As described above, according to Embodiments 1 and 2, the upper and lower portions (straight portions 1b) of the circumferential portion (circumferential side surface) of the base 1 are vertically tilted from the direction perpendicular to the major surface 1a of the base 1 so that the height in the vertical direction of the semiconductor laser apparatus 8, BA is minimized. When the semiconductor laser apparatus 8, 8A is attached to the housing with a predetermined angle, an angle between each straight portion 1b and the major surface 1a is determined, depending on the predetermined angle. Thereby, an increase in the thickness A of the semiconductor laser apparatus 8, 8A is substantially suppressed, thereby making it possible to fabricate the thinner optical pickup apparatus 10, 10A.

In Embodiments 1 and 2, the upper and lower circumferential side surfaces (the straight portions 1b) of the base 1 on whose major surface 1a the semiconductor laser device 2 is mounted are tilted in the same direction from the direction perpendicular to the major surface 1a so that the height in the vertical direction of the semiconductor laser apparatus 8, 8A is minimized. The present invention is not limited to this. The upper and lower circumferential side surfaces of the base 1 on whose major surface 1a the semiconductor laser device 2 is mounted are tilted from the direction perpendicular to the major surface 1a so that the height in the vertical direction of the semiconductor laser apparatus 8, 8A is reduced. In these cases, the upper and/or lower circumferential side surfaces of the base 1 may, or may not, be horizontal. Further, the entire circumferential side surface of the base 1 may be tilted from the direction perpendicular to the major surface 1a so that the height in the vertical direction of the semiconductor laser apparatus 8, 8A is minimized or reduced.

Further, in Embodiment 1, the arc portion 1c is engaged with the housing (not shown) of the optical pickup apparatus 10, and is used to rotate the base 1 so as to adjust a site to be irradiated with light. However, in most cases, the adjustment of the site to be irradiated with light is unnecessary or an amount of the adjustment is minute. Therefore, the base 1 can be substantially the same as that of when no adjustment (no rotation) is performed. In any event, when the upper and lower surfaces of the circumferential side surface of the base 1 are tilted from the direction perpendicular to the major surface 1a so that the height in the vertical direction of the semiconductor laser apparatus 8, 8A is reduced, the thinning effect of the exemplary embodiment presented herein is obtained.

Further, in Embodiments 1 and 2, the reflection mirror 4 is provided for reflecting laser light emitted from the semiconductor laser apparatus 8, 8A toward the objective lens 5. The semiconductor laser apparatus 8, 8A is tilted with respect to the housing with a predetermined angle so that the lower edge of the semiconductor laser apparatus 8, 8A is disposed higher than the lower edge of the reflection mirror 4. In addition to this or apart from this, the semiconductor laser apparatus 8, 8A may be tilted with respect to the housing with a predetermined angle so that the upper edge of the semiconductor laser apparatus 8, 8A is disposed lower than the upper edge of the objective lens 5. Also in this case, an angle between each straight portion 1b of the circumferential side surface of the base 1 and the major surface 1a in the semiconductor laser apparatus 8, 8A is determined, depending on the above-described predetermined angle.

Embodiment 3

In Embodiment 3, an example of a specific structure of the semiconductor laser apparatus 8A of Embodiment 2 will be described.

Figure 3:
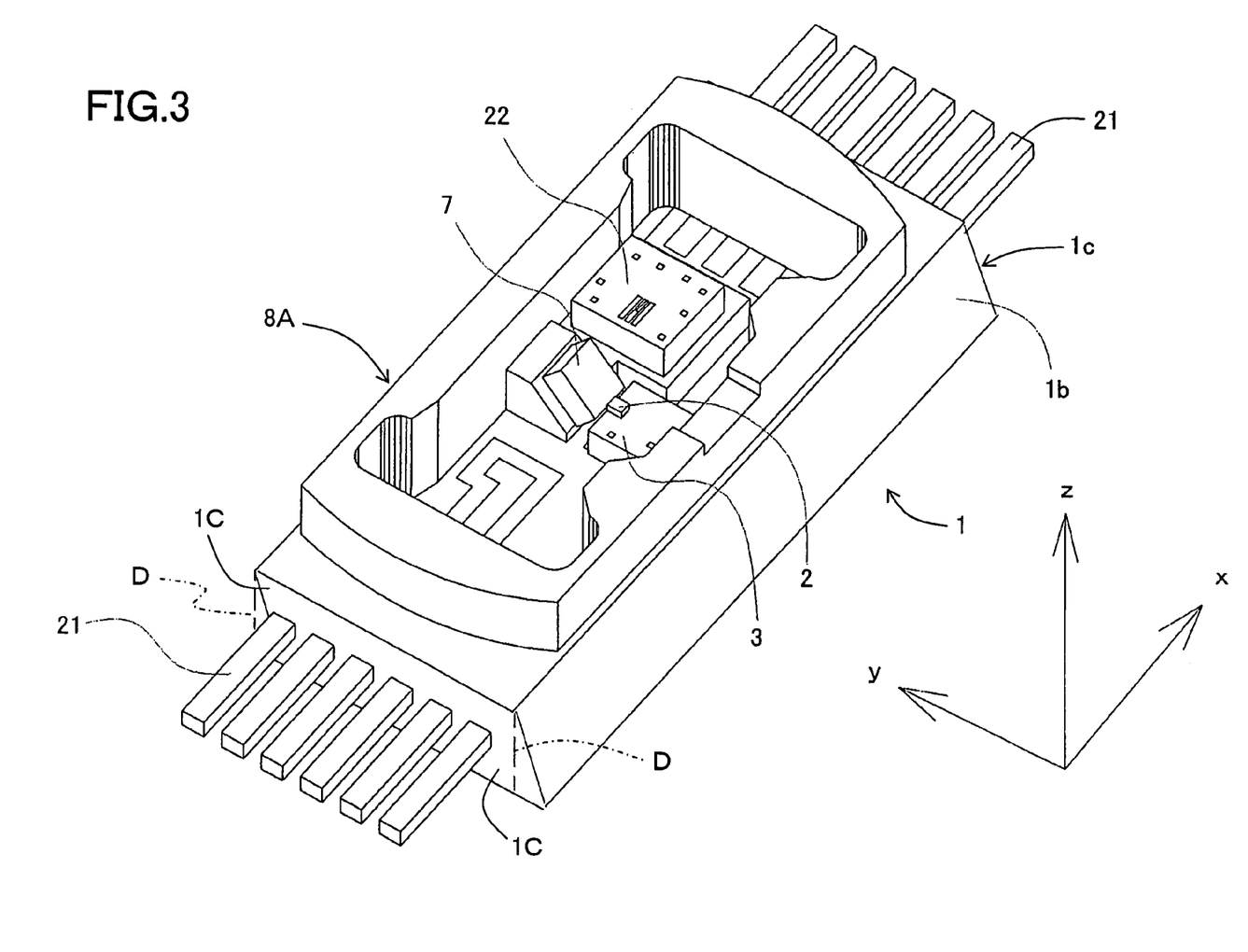
FIG. 3 is a perspective view showing an exemplary specific structure of the semiconductor laser apparatus of FIG. 2.

FIG. 3 is a perspective view showing the exemplary specific structure of the semiconductor laser apparatus of FIG. 2.

In FIG. 3, as the exemplary specific structure, the semiconductor laser apparatus 8A comprises: an insulating package (base 1) which is an insulating frame in a concave form; a plurality of leads 21 (conductive lead members) which are disposed on each of front and rear surfaces 1c (left- and right-hand side surfaces) of the concave insulating package, the front and rear surfaces 1c facing each other, each lead 21 extending from the inside of the insulating package to the outside; a semiconductor laser device 2 which is disposed on an inner, bottom surface of the insulating package and emits laser light; a reflection mirror 7 (raising mirror) which reflects the laser light from the semiconductor laser device 2 to the outside; an optical device which is provided in front of the reflection mirror 7 and splits and emits laser light, which has been emitted from the semiconductor laser device 2 and reflected and returned from an external reflection object (disc) which stores information; and a signal photodetector 22 which receives the split laser light. Inside the insulating frame of the insulating package, an end of each lead 21 is electrically connected via a wire to electrodes of the semiconductor laser device 2 and the signal photodetector 22 so as to drive them.

The optical device is not shown in FIG. 3. The optical device may be composed of a hologram device which can bring light into focus at a target site. Returning laser light which has been modulated and reflected on an information recording surface of a disc is diffracted using a diffraction grating provided in the hologram device. The laser light is split by the diffraction grating and is directed to the signal photodetector 22. The signal photodetector 22 detects information recorded on the disc 6. Note that the optical device is not limited to the hologram device. Any device which can transmit returning laser light toward the signal photodetector 22 can be used. As the optical device, for example, a half mirror may be provided in front of the reflection mirror 7, which causes laser light emitted from the semiconductor laser device 2 to travel in a straight line and reflects returning laser light toward the signal photodetector 22. In other words, the half mirror transmits one of laser light traveling from the semiconductor laser device 2 and laser light traveling in the opposite direction, and reflects the other laser light toward a predetermined direction.

The optical device is provided in a manner so that it covers an opening of the concave inner portion of the insulating package. At least one of upper and lower surfaces 1b of the circumferential side surface of the insulating package and a side surface of the optical device are tilted from a direction (dashed line D) perpendicular to the bottom surface of the concave inner portion on which the semiconductor laser device 2 and the signal photodetector 22 are provided, in a manner that reduces or minimizes the height in the vertical direction of the insulating package and the optical device (a distance in a lateral direction in FIG. 3).

The signal photodetector 22 receives laser light split by the optical device, and optoelectrically converts the returning laser light (information recorded on a disc) to an electrical signal to detect the recorded information. The signal photodetector 22 also performs focus error detection and tracking error detection.

In Embodiment 3, the optical device is disposed in front of the reflection mirror 7 as an exemplary specific structure of Embodiment 2. Instead, the optical device may be disposed in front of the semiconductor laser device 2 to achieve an exemplary specific structure of Embodiment 1.

The exemplary embodiment presented herein provides a semiconductor laser apparatus for recording/reproducing information onto/from an information recording medium (optical disc) and an optical pickup apparatus using the same. Specifically, upper and lower portions (straight portions) of a circumferential portion (circumferential side surface) of a base are vertically tilted from a direction perpendicular to a major surface of the base. Therefore, when a semiconductor laser apparatus is attached to a housing with a predetermined angle, an increase in thickness is substantially suppressed, thereby making it possible to obtain a thinner optical pickup apparatus. With the thin optical pickup apparatus, a small and thin recording/reproduction apparatus for recording/reproducing an optical disc can be achieved.

Although certain preferred embodiments have been described herein, it is not intended that such embodiments be construed as limitations on the scope except as set forth in the appended claims. Various other modifications and equivalents will be apparent to and can be readily made by those skilled in the art, after reading the description herein, without departing from the scope and spirit of the exemplary embodiment presented herein. All patents, published patent applications and publications cited herein are incorporated by reference as if set forth fully herein.

What is claimed is:

1. A semiconductor laser apparatus, comprising:
   a semiconductor laser device for emitting laser light; and
   a base having a major surface and a circumferential side surface, the circumferential side surface having an upper surface and a lower surface,
   wherein the semiconductor laser device is mounted on the major surface of the base,
   said upper surface and said lower surface of the circumferential side surface are parallel to each other, and
   the upper and lower surfaces of the circumferential side surface are tilted from a direction perpendicular to the major surface so that a height in a vertical direction of the semiconductor laser apparatus, said vertical direction being perpendicular to the upper and lower surfaces, is reduced or minimized.

2. A semiconductor laser apparatus according to claim 1, wherein the circumferential side surface of the base has two arc portions and two straight portions, the two arc portions being disposed in left- and right-hand positions in a front view, and the two straight portions being vertically disposed between the two arc portions and parallel to each other, and the two straight portions being tilted in the same direction from the direction perpendicular to the major surface.

3. A semiconductor laser apparatus according to claim 1, wherein the semiconductor laser device is mounted on the major surface of the base while being mounted on a monitor submount section.

4. A semiconductor laser apparatus according to claim 1, wherein a signal photodetector of receiving incident light to detect a signal, and an optical device of splitting laser light returning from the outside thereof toward the signal photodetector, are provided on the major surface of the base.

5. A semiconductor laser apparatus according to claim 1, wherein the semiconductor laser device is disposed in a manner that emits laser light in the direction perpendicular to the major surface of the base.

6. A semiconductor laser apparatus according to claim 1, wherein the semiconductor laser device is disposed in a manner that emits laser light in a direction parallel to the major surface of the base, and
   the semiconductor laser apparatus further comprises:
   a raising mirror section for reflecting the laser light emitted from the semiconductor laser device to change a traveling direction of the laser light to the direction perpendicular to the major surface of the base.

7. A semiconductor laser apparatus according to claim 4, wherein the base is an insulating frame in a concave form,
   the base has a plurality of conductive lead members in left- and right-hand surfaces of the circumferential side surface of the insulating frame, each conductive lead member extending from an inside to an outside of the left- and right-hand surfaces of the insulating frame, and
   each conductive lead member is connected via a wire to electrodes of the semiconductor laser device and the signal photodetector in the insulating frame.

8. A semiconductor laser apparatus according to claim 7, wherein the optical device is disposed in a manner so that it covers an opening of a concave inner portion of the insulating frame, and
   the upper and lower surfaces of the circumferential side surface of the insulating frame and a side surface of the optical device are tilted from a direction perpendicular to a bottom surface of the concave inner portion on which the semiconductor laser device and the signal photodetector are disposed, so that the height in the vertical direction of the semiconductor laser apparatus is reduced or minimized.

9. A semiconductor laser apparatus according to claim 4, wherein the optical device is either a hologram device including a diffraction grating for diffracting laser light or a half mirror for transmitting one of laser light traveling from the semiconductor laser device and laser light traveling in a direction opposite thereto and reflecting the other laser light toward a predetermined direction.

10. A semiconductor laser apparatus according to claim 4, wherein the signal photodetector receives the laser light split by the optical device to detect information recorded on a disc from the returning laser light, and performs focus error detection and tracking error detection.

11. An optical pickup apparatus, comprising:
    a semiconductor laser apparatus according to claim 1; and
    a housing section,
    wherein the semiconductor laser apparatus is fixed to the housing section in a manner such that the semiconductor laser apparatus is tilted from the housing section with a predetermined angle.

12. An optical pickup apparatus according to claim 11, further comprising:
    an objective lens section; and
    a reflection mirror section for reflecting the laser light emitted from the semiconductor laser apparatus toward the objective lens section, wherein the semiconductor laser apparatus is tilted with respect to the housing section with the predetermined angle such that a lower edge of the semiconductor laser apparatus is disposed higher than a lower edge of the reflection mirror section.

13. An optical pickup apparatus according to claim 11, further comprising:

an objective lens section; and a reflection mirror section for reflecting the laser light emitted from the semiconductor laser apparatus toward the objective lens section, wherein the semiconductor laser apparatus is tilted with respect to the housing section with the predetermined angle such that an upper edge of the semiconductor laser apparatus is disposed lower than an upper edge of the objective lens.

14. An optical pickup apparatus according to claim 11, wherein an angle between the upper surface and/or the lower surface of the circumferential side surface of the base in the semiconductor laser apparatus is determined, depending on the predetermined angle.

* * * * *